United States Patent
Hagen et al.

(10) Patent No.: US 9,250,435 B2
(45) Date of Patent: Feb. 2, 2016

(54) OPTICAL ASSEMBLY COMPRISING TWO MONOCULARS AND A CONNECTING BRIDGE

(75) Inventors: Christoph Hilmar Graf vom Hagen, Giessen (DE); Sven Roman Mueller, Butzbach (DE)

(73) Assignee: Schmidt & Bender GmbH & Co. KG, Biebertal (DE)

( * ) Notice: Subject to any disclaimer, the term of this patent is extended or adjusted under 35 U.S.C. 154(b) by 134 days.

(21) Appl. No.: 13/089,606

(22) Filed: Apr. 19, 2011

(65) Prior Publication Data

US 2012/0069431 A1    Mar. 22, 2012

(30) Foreign Application Priority Data

May 4, 2010    (DE) .......................... 10 2010 016 785

(51) Int. Cl.
| | |
|---|---|
| *G02B 23/00* | (2006.01) |
| *G02B 23/18* | (2006.01) |
| *G03B 23/18* | (2006.01) |
| *G02B 7/06* | (2006.01) |
| *G02B 23/12* | (2006.01) |
| *G02B 7/12* | (2006.01) |

(52) U.S. Cl.
CPC *G02B 23/18* (2013.01); *G02B 7/06* (2013.01); *G02B 23/12* (2013.01); *G02B 23/125* (2013.01); *G03B 23/18* (2013.01); *G02B 7/12* (2013.01)

(58) Field of Classification Search
CPC ........ G02B 23/16; G02B 23/18; G02B 23/02; G02B 23/00; F41G 1/38
USPC .................................................. 359/399–431
See application file for complete search history.

(56) References Cited

U.S. PATENT DOCUMENTS

| | | | |
|---|---|---|---|
| 4,555,747 A | 11/1985 | Tsuruta | |
| 5,229,598 A | 7/1993 | Filipovich | |
| 5,535,053 A | 7/1996 | Baril et al. | |
| 5,703,354 A * | 12/1997 | Wannagot et al. | 250/214 VT |
| 6,456,497 B1 * | 9/2002 | Palmer | 361/752 |
| 6,493,137 B1 | 12/2002 | Solinsky et al. | |
| 6,687,053 B1 | 2/2004 | Holmes et al. | |
| 7,365,905 B2 | 4/2008 | Floyd et al. | |
| 2006/0164401 A1 | 7/2006 | Ishida | |
| 2007/0267567 A1 | 11/2007 | Filipovich et al. | |
| 2008/0007826 A1 * | 1/2008 | Smith et al. | 359/407 |
| 2012/0069431 A1 | 3/2012 | Hagen et al. | |

FOREIGN PATENT DOCUMENTS

EP    2 065 742    6/2009

* cited by examiner

*Primary Examiner* — Stephone B Allen
*Assistant Examiner* — Tamara Y Washington
(74) *Attorney, Agent, or Firm* — Clark & Brody

(57) ABSTRACT

An optical assembly includes a connecting bridge to link up two autonomous optical units. The optical units are electronically connected to an analyzer. The connecting bridge is fitted each time with at least one coupling for each optical unit, said coupling making it possible, besides a mechanical coupling action, for the transmission of electronic signals and/or setting up an electric connection.

6 Claims, 1 Drawing Sheet

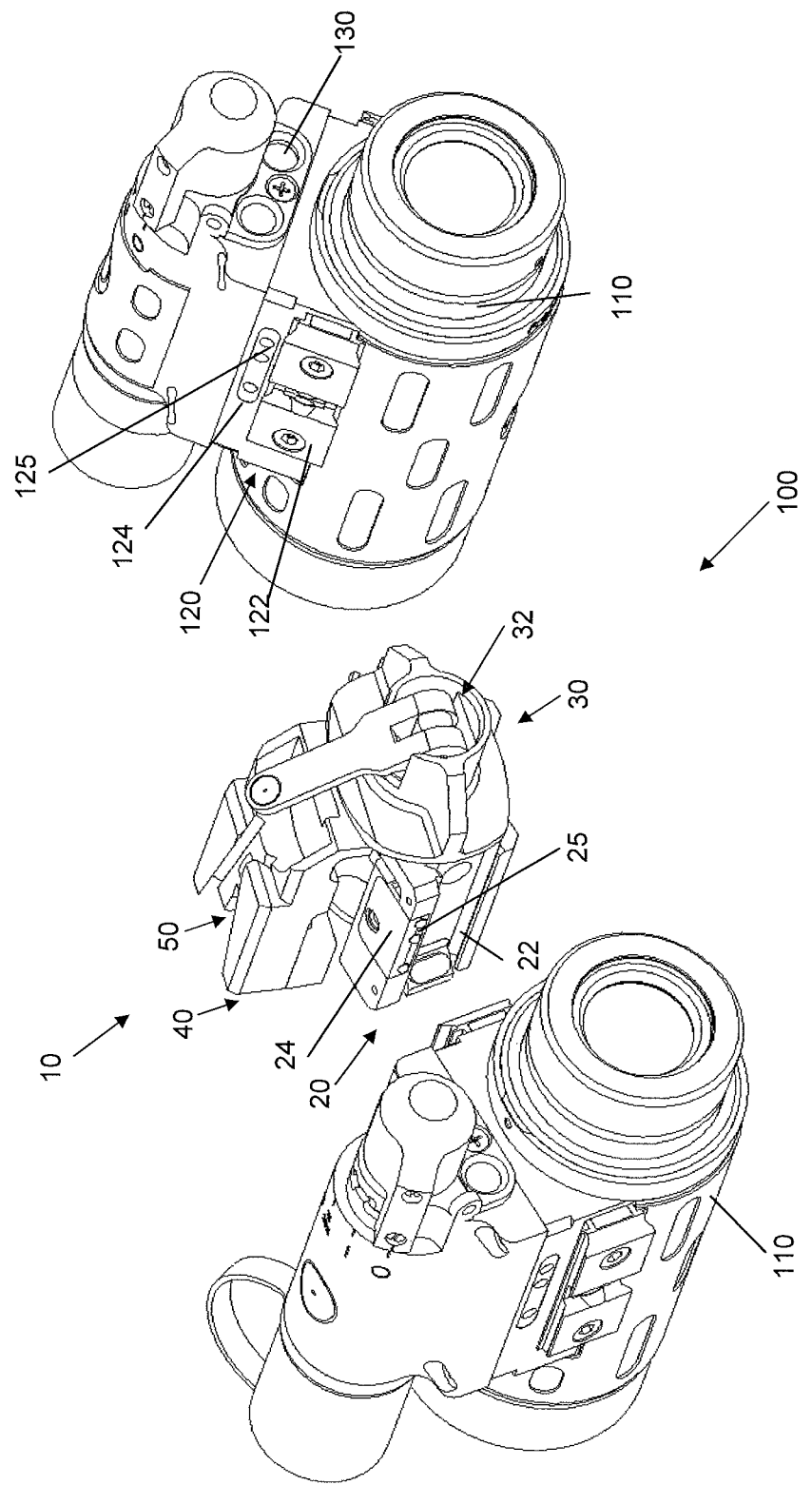

OPTICAL ASSEMBLY COMPRISING TWO MONOCULARS AND A CONNECTING BRIDGE

FIELD OF THE INVENTION

The present invention relates to an optical assembly comprising a connecting bridge and at least two optical units each fitted with a coupling having mechanical coupling elements designed for a mechanical connecting bridge coupling.

BACKGROUND ART

Such optical assemblies comprising said connecting bridges basically are known in the form of optical magnifiers respectively binoculars. These known connecting bridges typically are firmly connected to the particular telescope/monocular, as a result of which one assembly is constituted by two monoculars and one connecting bridge. The known connecting bridges incur the drawback of insufficient operational flexibility. They preclude using different optical units depending on different operational conditions, respectively combining them. Similar bridges also are basically known with respect to night-vision instruments and they serve as a mechanical link between two optical units illustratively designed as low light intensifiers. In this case too the firm affixation between the low light intensifiers and the connecting bridge entails a substantial operational lack of flexibility. Further limits are placed on the range of functions of such optical assemblies because each optical unit operates by itself. When using so-called image intensifier tubes, each optical unit requires its own regulator.

SUMMARY OF THE INVENTION

Accordingly it is the objective of the present invention to remedy the drawbacks of known designs. In particular the present invention relates to an optical assembly comprising a connecting bridge allowing high flexibility under a variety of operational conditions while at the same being easy to manufacture. Also said bridge shall be low-weight and offer good optical properties.

As regards an optical assembly comprising a connecting bridge and at least two optical units each having a coupling with mechanical coupling elements that are designed for a mechanical coupling action of the connecting bridge, the present invention stipulates that the optical units be electronically connected to an analyzer.

In the present invention, an optical assembly consists of an intelligent connecting bridge to comprising an analyzer and preferably two optical units. The underlying reason is that the optical assembly of the invention shall be predominantly used on humans. Accordingly a design restricted to two optical units—namely one optical unit per eye—shall suffice.

The analyzer is electronically connected by coupling elements to the optical units. The coupling elements may be designed in different ways and—besides exchanging electronic signals—also/or may set up an electrical connection between the analyzer and the optical units. The design of the coupling elements is arbitrary. Illustratively plug-in connections or radio links may be used.

Signal analysis for instance may be in the form it of preparing and interpreting the signals. Illustratively voltage signals may be received from the optical units' batteries and may be analyzed to determine the particular battery charges. This design enables the analyzer to identify the particular charges of the optical units and even to rate them. If additionally the analyzer is designed to permit up an electrical connection to be set up by means of electronic coupling elements, then, if the charge of the battery of a first optical unit was rated being critical, an electrical connection to the second optical unit's battery may be set up by means of the electronic coupling elements. In this manner both optical units will be fed with power from a single battery. Consequently the overall optical assembly will remain operational for a longer time.

However the analyzer also may carry out other or further signal ratings. Illustratively the instantaneous optical ambience, that is, when using night vision instruments, the ambient low light-level intensity, may be sensed as a signal by the optical units and, depending on such light intensity, another intensification mode may be selected or an infrared lamp shall be switched ON. The analyzer and the electronic coupling elements make it possible to increase the intelligence of an optical assembly of the invention and to support the user when operating the optical units.

The analyzer is advantageously able to rate signals it receives from the electronic coupling elements with respect to at least one of the following parameters:

optical units' battery status
operational situation of the optical units
ambient parameters of the optical operational situation
low light-level intensity.

The listing above is not limitative at all, instead it merely illustrates various ways in which to provide the optical assembly of the present invention with additional applications and thereby higher user comfort. When operation of said assembly includes rating the battery status, the instantaneous charge of each optical unit is read out, that is, it is detected and analyzed by the exchange of signals of the electronic coupling elements. Illustratively such rating applies to the ascertained remaining service life of the particular battery, hence the residual usage time of the particular optical unit. In the presence of a differential in residual usage times between the optical units, the analyzer may intervene to compensate. In other words, the analyzer by means of the electronic coupling elements sets up an electrical connection to the particular optical unit and therefore to the particular battery. The stronger battery, i.e. the battery with the higher charge, then supports the weaker battery, as a result of which the residual usage time of one optical unit is reduced while that of the other optical unit is extended. In this way the total time of usage of the optical assembly is extended because operating only with a single optical unit represents substantial discomfort. Moreover a battery may be exchanged while the said optical assembly is running.

When analyzing the ambient parameters, for instance the ambient brightness may be measured and the particular mode and degree of the optical units' intensification may be matched to said ambient brightness, these optical units in this instance acting as night-vision instruments. As the brightness increases, the analyzer may lower the intensification, whereas, if it decreases unduly, an infrared lamp can be switched ON. Said infrared lamp may be configured at one optical unit or at both or even be integral with them. In one embodiment mode of the optical assembly of the invention, additional IR illumination at several levels of intensity may be switched on, the danger of being detected being reduced as a result.

Advantageously the connecting bridge is also fitted with a magnetic sensor in order to read the positioning magnet of a helmet or head support which also may be connected to the analyzer.

Besides the presence of an analyzer, a regulator advantageously may be used, which is connected electronically to said analyzer to exchange signals and regulates at least one of the optical units as a function of the analyzer's signals. Illustratively regulation may be carried out as discussed in the paragraph immediately above.

In that manner the present invention offers a night-vision binocular not merely as a mechanical connection of two separate optical units, instead it creates a full-function binocular by introducing an analyzer. In other words a component driven by an operating element. Contrary to the design of the present invention, in the state of the art the operational status of a binocular always has been controlled individually. The assembly of the invention consolidates two optical units into one assembly which thereby can be operated by means of one functional component.

In a further embodiment mode of the present invention, the optical assembly comprises a connecting bridge with at least one coupling for each optical unit to link the particular optical unit to the connecting bridge. Said coupling accordingly serves to reversibly couple the particular optical unit on and off to the connecting bridge. This design offers a flexible optical assembly wherein, due to the capability of the connecting bridge, different optical units may be connected to each other in flexible manner. Aside from combining identical night-vision instruments, the particular optical unit also can be matched to the users' different visual acuities. Again, optical units based on different physical methods may be combined. Illustratively a combination of a low light-level intensifier and an infrared camera may be considered whereby the user by means of each eye sees the same scene image detail, however with different characteristics resp. at different operational stages. Accordingly, by using such a connecting bridge, the information content of an optical assembly may be flexibly adapted to the operational situation.

The coupling comprises both mechanical and electronic coupling elements which are configured in a manner that the electronic coupling elements shall establish electronic contact between the connecting bridge and the particular optical unit once the mechanical coupling elements have set up mechanical contact between the particular optical unit and the connection bridge.

In other words, the electronic coupling is automated by the mechanical coupling. This feature offers the advantage that the user need not implement any separate electronic connection, instead the desired operational readiness already is attained by the action of mechanical coupling. This feature illustratively may be implemented by the shape of the coupling elements and their configuration. Both mechanically and electronically, the coupling is reversible. This means that the optical units may be coupled to the connecting bridge and be uncoupled from it again as often as desired.

The expression electronic coupling herein denotes so-called intelligent coupling. Such a coupling for instance is able to exchange signals by means of electronic coupling elements. Conceivably again, alternatively or additionally, the electronic coupling means may constitute an electric connection transmitting an electric current, i.e., an electric circuit being subtended.

Various embodiment modes of the mechanical coupling elements may be thought of. Illustratively the mechanical coupling may be geometrically interlocking. Other mechanisms such as a clamping connection or magnetic coupling also are applicable.

The connecting bridge further comprises a connector extending at least segment-wise between the particular optical unit's couplings and linking them mechanically to each other. Illustratively the mechanical connection may be in the form of a framework or a dimensionally stable housing. The expression mechanical connection herein denotes implementing at least in part a frictional bonding between the couplings and the connector.

To further enhance connecting bridge flexibility, the connector is advantageously linked by at least one rotational joint to at least one of the couplings in a manner that the coupling so linked is able to rotate at least partly about the axis of rotation of said joint relative to the connector. In this way the position of the particular coupling and hence also of the optical unit coupled to it is adjustable in flexible manner.

In that way for instance the spacing between the two optic units may be varied within limits. This feature is significant when desiring compensating for users' different interpupillary distances. Depending on the extent of rotation, such an embodiment mode also allows completely swiveling away the particular optical unit. This feasibility is significant for instance regarding optical units in the form of night vision instruments when rapid change in application is required between zones of different brightnesses.

When the user moves out of a dark zone wherein the optical units, namely the night vision instruments are needed, into a bright zone, for instance a room of a building, then he is able thanks to the said rotation to quickly swivel the night vision instrument out of his field of view. In this way rapidly changing between a field of view with an optical unit and a field of view without an optical unit is possible. In a special further embodiment mode, a magnetic switch is fitted onto a mechanical joint and connected to the analyzer. Said magnetic switch transmits the particular position of the optical units to the analyzer which then, in cooperation with the regulator, activates resp. deactivates desired functions such as low light level intensification.

Alternatively or in addition to connection by means of a rotary joint, it may be advantageous that, for a connecting bridge, the coupling be connected by at least one translational element to at least one coupling in a way to attain a variable spacing of the coupling thusly linked to the connector be variable. Translational adjustability is especially significant when relatively large spacing differentials are desired. Accordingly using a translation element is especially appropriate when matching different users to different interpupillary distances.

The translation elements moreover may be made jointly with the rotary joint for special operational modes, enabling thereby a mixed motion of the particular coupling and thereby of the particular coupled optical unit, that is, enabling a mixture of rotation and translation. In this way more complex displacements of the particular coupling and therefore also of the particular optical unit are made possible.

Illustratively the translation elements may be in the form of a linear guide. In that case a carriage connected to the coupling can be displaced on a rail linked to the connector. Such a rail may run in a straight but also a curved line. Alternatively a lever kinematics may be used which allows translatory displacement of the particular coupling relative to the connector. Such a lever kinematics illustratively may be constituted by a plurality of rotationally supported levers.

It may be advantageous in another embodiment mode of the present invention that the electronic coupling element and mechanical coupling element of at least one coupling be at least partly mutually to integral. Such an integral design of the two functional parts of the electronic coupling elements and of the mechanical coupling elements offers the advantage of lowering the total weight of both elements. In that way too the total weight of the connecting bridge, hence also the total weight of an optical assembly designed in this manner, can be reduced. Especially as regards optical assemblies which are affixed to a helmet and shall be borne directly by the user, such a reduction in weight directly increases user comfort. Another advantage of the integral design is the very simple structure of the dependent coupling of the electronic coupling elements. Illustratively segments and/or surfaces used for mechanical coupling may be used simultaneously, so to speak in dual usage, also for electronic coupling.

An especially appropriate embodiment mode of the mechanical coupling elements of a connecting bridge for specific applications is the at least segment-wise dovetail guide. Such a guide is fitted with undercuts subtending an acute angle and able to cooperate mechanically with a corresponding dovetail bar. Such mechanical cooperation illustrative can be implemented by frictional locking or also by geometric interlocking.

It must be borne in mind that the dovetail guide is configured at the particular optical unit and the corresponding dovetail bar at the particular coupling. Using a dovetail guide and a corresponding dovetail bar offers the special advantage of a very simple coupling action. Thus, the dovetail bar can be inserted into the corresponding dovetail guide, thereby already implementing mechanical coupling, that is the feasibility of force transmission. Such mechanical coupling leaves only one degree of freedom of relative displacement between the optical unit and the mechanical coupling element. Latter may be fitted, in the direction of insertion, with a mechanical stop, as a result of which the optical unit during insertion into the mechanical coupling element will make contact. As a result an end position is defined, respectively an operational position of the optical unit. As regards high mechanical loads, the last degree of displacement freedom may be provided by securing the optical unit against being extracted from resp. pushed out of the mechanical coupling element, said optical unit thereby being stopped in the mechanical coupling element.

Said mechanical stop may be advantageous not only with respect to dovetail guide embodiment modes, but basically with every optical assembly. Fasteners may be used to affix the mechanical coupling elements of at least one coupling in its coupled state to the particular optical unit. The fasteners offer reversible affixation and are matched to the design of the mechanical coupling elements. Depending on the kind of mechanical coupling elements, the required number of degrees of freedom predetermined by the coupling elements and remaining following the coupling action is secured and thereby the optical assembly is supported in the mechanical coupling element in statically defined manner. Illustratively a mechanical stop plate may be used which, depending on the rotary position, assumes the last degree of freedom of the optical unit relative to the mechanical coupling elements. It may be to advantage furthermore when the affixation means are configured centrally for all the mechanical coupling elements of all couplings. Such a design allows weight reduction and moreover improvement in use because only one stopping step, that is a single affixation step, need being carried out.

The electronic coupling elements of an optical assembly of the invention may be constituted at least partly by contact surfaces touching the corresponding contact surfaces of the particular optical unit. In especially simple cases, the particular corresponding contact surfaces of the particular electronic coupling element and of the particular optical unit will make contact. This means that the contact surfaces come to rest against each other, as a result of which an electric contact for signal exchange or for the setup of an electrical connection is possible. The contact surfaces and basically all contact segments of the electronic coupling elements are made of an electrically conducting material.

It is advantageous, as regards embodiment modes of which the electrical coupling elements are fitted with several contact surfaces resp. several contact segments, that the configuration of said surfaces/segments be asymmetrical, i.e. polarized. Such asymmetry offers the advantage to avoid that a wrong connection, that is a wrong coupling of the electronic coupling elements. This is especially important for operational situations where a circuit, that is an electrical connection, should be closed, namely to avert an electrical short.

In an alternative embodiment mode of the invention, electronic coupling elements are used which, for at least one coupling, shall be plug-in connections. Such plug-in connections illustratively are fitted with a snap-in connector allowing reversible snap-in connection of the established electronic coupling. This feature precludes very substantially that the electronic coupling be accidentally separated. The securing of the electronic coupling is especially advantageous in operational situations where high mechanical stresses may be applied to the connecting bridge and the coupling. Accidentally uncoupling the optical units—which in the worst case would entail switching off the particular optical unit, for instance as regards darkening the field of view of a night-vision instrument—shall be averted thereby.

Depending on the embodiment mode of the optical assembly of the invention, it may be advantageous to design the mechanical coupling elements of at least one coupling that the position of the particular optical unit relative to the connecting bridge be adjustable axially along the optic axis of this particular optical unit. The said unit's optic axis is defined by the line of sight, i.e. the main axis of view of the particular optical unit. In other words, in this way the distance between a user's eye and the optical unit may be varied. Such a variation illustratively can be implemented by changing the position of a mechanical stop in a guide of the mechanical coupling element.

A further objective of the present invention is an optical assembly comprising a connecting bridge and two optical units, said units also being fitted with a coupling having both mechanical coupling elements and electronic coupling elements designed for mechanically and electronically linked to the connecting bridge's coupling.

In other words, the mechanical coupling elements and the electronic coupling elements of the particular coupling of the optical units and of the connecting bridge are complementary resp. matching. With such apparatus an optical assembly is attained offering all the advantages required for operation.

Advantageously the electronic coupling elements of the optical units of an optical assembly of the invention are asymmetrical/polarized. As a result, when mechanically coupling the optical units to the connection bridge, it is impossible to wrongly connect the electronic coupling elements of both parts. An electric short in particular is averted.

In especially advantageous manner, the present invention calls for the optical units being monoculars. Monoculars are defined as modular optical units which per se comprise all the features of an optical unit comprising an electronic. Illustratively and frequently, each monocular may have its own integrated voltage supply as well as drive elements. This means that when actuating a drive element of the monocular, the corresponding function in a further monocular shall be simultaneously switched on by means of the analyzer and the regulator.

Such an optical assembly of the invention comprises optical units in particular in the form of night vision instruments. Illustratively said instruments are in the form of low light level intensifiers. Said night vision instruments being complex and in particular being fitted with battery-based power sources, the advantages of the present invention are particularly applicable. Both a weight-reducing design and a longer service-life make such optical assemblies more user-friendly.

In a further embodiment mode of the invention the monoculars each comprise an image intensifier tube. These image intensifier tubes are modular components and thereby can be removed very easily from the monocular and illustratively be exchanged for another technical device such as a rangefinder. Accordingly the said optical assembly is highly versatile.

Advantageously too when using optical units in the form of night vision instruments, at least one of the monoculars may be fitted with a connectable light source. In the event of inadequate low light level, said connectable light source when in use makes possible a sufficiently bright image. To protect the user of an optical assembly from being detected, said light source preferably operates in a wavelength range invisible to the human eye. Illustratively an infrared lamp may be used. This light source, illustratively in the infrared range, may be of very low weight, for instance being an LED. Aside its low weight, an LED light source also offers low power drain on the battery of the particular night vision instrument.

However more powerful infrared lamps also may be used in an optical assembly of the present invention because the increased power drain from these bigger lamps may be applied through the analyzer and the electronic coupling elements to both batteries of the two night vision instruments and be borne by both. The application of the optical assembly of the present invention allows for the first time using a high current drain infrared lamp while preserving a satisfactory service life.

A further embodiment mode of the present invention comprises monoculars which are fitted with an ocular and an objective lens and designed in a way to display a field of view larger than 40° per ocular in the plane being observed. The enlarged field of view also allows peripheral viewing by the night vision instrument. This feature is especially useful when being airborne. A helicopter pilot bearing an optical assembly of the invention thus can read edge zones of his field of view without need to continuously turn his head. The higher peripheral sharpness also enable increased readout reliability, the assembly's higher resolution making more details perceptible.

BRIEF DESCRIPTION OF THE DRAWINGS

The invention is elucidated below in relation to the appended drawing. The expressions "left", "right", "top", "bottom" used in the discussion of said FIGURE relate to it in a direction with typically legible reference numerals.

FIG. 1 represents an embodiment of an optical assembly of the invention comprising an optical connecting bridge.

DETAILED DESCRIPTION OF THE INVENTION

FIG. 1 shows one embodiment mode of the present invention. In particular it shows an optical assembly 100 comprising, in its unassembled and uncoupled state, a connecting bridge 10 and two optical units 110 in the form of night-vision instruments. The night vision instruments are designed as low light level intensifiers. The discussion below relates to the range of functions of the connecting bridge 10 per se, also in relation to the optical units 110.

The connecting bridge 10 is shown in FIG. 1 in its uncoupled state. It comprises at each side a coupling 20, one of which is shown in FIG. 1. Each of the two couplings 20 comprises mechanical coupling elements 22 and electronic coupling elements 24 to link up with the optical units 110. The mechanical coupling elements 22 constitute a dovetail guide.

The two optical units 110 each comprise two couplings 120, FIG. 1 showing one coupling 120 per optical unit 110. Providing two couplings 120 per optical unit 110 allows universally coupling each optical unit 110 to the left or right side of the connecting bridge 10.

Each coupling 120 of the two optical units 110 comprises moreover mechanical coupling elements 122 and electronic coupling elements 124. The coupling elements 122 and 124 of the couplings 120 match the coupling elements 22 and 24 of the connecting bridge 10. The mechanical coupling elements 122 of the optical units 110 each are designed as dovetail bars. Such a dovetail bar can be inserted into the dovetail guide of the mechanical coupling element 22 of the connecting bridge 10. Said insertion takes place along the optic axis of the particular optical unit 110. A mechanical stop (not shown) in the mechanical coupling element 22 of the connecting bridge 10 allows fixing in place the position of the optical unit 110 relative to said optics axis.

The dovetail guide cooperates with the dovetail bar by means geometrically interlocking the coupling 20 of the connecting bridge 10 with the coupling 120 of the optical unit 110. Said geometric interlock also operates as frictional locking. In other words, the optical unit 110 is supported in this manner in the mechanical coupling element 20 of the connecting bridge 10.

To further improve the support of the optical unit 110, a fastener 32 is provided in the embodiment mode of FIG. 1 at the connector 30 of the connecting bridge 10. This fastener 32 is designed as a mechanical stop plate fitted with a tightening lever. The position of this fastener 32 is shown closed in FIG. 1.

In order to insert the optical units 110, that is, to couple them to the connecting bridge 10, the tightening lever of the fastener 32 is actuated, that is, it is moved in FIG. 1 at the front to the right. Thereupon the stop plate of the fastener 32 is rotated by 90° and thus opens the access to the mechanical coupling elements 22 of the connecting bridge 10. The dovetail bars of the optical units 110 can now be slipped into position and thereby establish mechanical coupling. Next the stop plate is again rotated by 90° and in this position locks the mechanical coupling elements 22 of the connecting bridge 10 resp. the mechanical coupling elements 122 of the optical unit 110 in the mechanically locked state. In this state the optical unit 110 is supported in statically defined manner.

Besides the mechanical coupling elements 22 resp. 122, both the optical units 110 and the connecting bridges 10 are fitted with electronic coupling elements 24 resp. 124. At both of these parts, namely at the optical units 110 and the connecting bridge 10, these electronic coupling elements 24 and 124 are in the form three flat contact spots 125. The configuration of these three contact spots 125 always is asymmetrical, i.e. polarized, as a result of which a wrong connection, that is wrong electronic contacting, shall be precluded.

The electronic coupling elements 24 and 124 are configured in a way that they shall automatically make contact with one another as soon as the mechanical coupling elements 22 are coupled to each other. The position of the optical units 110 relative to the connecting bridge 10—and thereby also the relative position of the electronic coupling elements 24 and 124 to each other—is assured on one hand by the dovetail guide and on the other hand by the combination of a mechanical stop and the fastener 32. As a result, in the mechanically coupled state, only a single defined position relative to the electronic coupling elements 24 of the connecting bridge 10 exists for the electronic coupling elements 124 of the optical units 110. In this manner, due to the accurately defined positioning depending on the mechanical coupling elements 22 and 122, the electronic coupling also may be established in automated manner.

The analyzer 40 and the regulator 50 are configured inside the connector 30 of the connection bridge 10 but not shown in further detail. Both said analyzer 40 and the regulator 50 in this embodiment mode are designed as a central computer part and, by means of the electronic coupling elements 24 of the connecting bridge 10 when in the coupled state, they are connected to the electronic coupling element 124 of the particular optical unit 110. By this design, besides attaining only an exchange of signals, an electric connection between the two optical units 110 may also be set up, as a result of which illustratively an exchange of, resp. mutual support of, the optical units 110 is possible when there is a weak battery.

The connector 30 is designed as a mechanically durable housing that, besides mechanically connecting the two couplings 20, also encloses the analyzer 40 and the regulator 50.

Moreover the connector 30 comprises a purely mechanical interface configured its top side. The connecting bridge 10 can be configured by means of said purely mechanical interface to a support, for instance to a helmet or a head piece. In this way the user of such an optical assembly 100 may operate it without the need to hold it manually before his eyes. Said mechanical interface moreover is reversible, allowing repeated application to and removal from the connecting bridge 10. It is immaterial furthermore whether at the time of affixation, the optical units 110 already were affixed to the connecting bridge 10 or not.

Also a battery drawer is configured at both optical units 110 at the top side of each unit and is fitted with a cover on the back side. Furthermore two additional light sources 130 are provided at each optical unit 110 which are infrared LEDs in the embodiment mode of FIG. 1. Said LEDs are switched on in the event of inadequate light conditions to provide low light level intensification to the optical units 110. Said LEDs also are supplied with power by means of the battery of the particular optical unit 110.

Depending on ambient light levels, a decision is taken whether one or all light sources should be switched ON. Again, a configuration with a plurality of LEDs offers safety against power failure.

LIST OF REFERENCES

10 connecting bridge
20 coupling
22 mechanical coupling element
24 electronic coupling element
25 contact surfaces
30 connector
32 fastener
40 analyzer
50 regulator
100 optical assembly
110 optical unit
120 coupling
122 mechanical coupling element
124 electronic coupling element
125 contact surfaces
130 light source

The invention claimed is:

1. An optical assembly (100) comprising:
a connecting bridge (10),
and two monoculars (110),
a first of the two monoculars (110) comprising an own first battery-based power unit and an own first drive elements, a second of the two monoculars (110) comprising an own second battery-based power unit and own second drive elements,
each of the two monoculars (110) fitted with a coupling (120) having mechanical coupling elements (122) that are designed for a mechanical coupling (20) of the connecting bridge (10),
the connecting bridge (10) further comprising an analyzer (40),
wherein both of the two monoculars (110), the two monoculars (110) still including respective own first and second battery-based power units and the respective own first and second drive elements, are coupled, using the mechanical coupling elements (122), to the mechanical coupling (20) of the connecting bridge (20) with the analyzer (40), and
both of the two monoculars (110) are connected electronically to the analyzer (40), the analyzer (40) is connected electronically to a regulator (50) for a purpose of exchanging signals and regulating, as a function of signals of the analyzer, at least one of the two monoculars (110) and
the two monoculars (110) are consolidated into one assembly such that when actuating one of the respectively own drive elements of one of the two monoculars (110), a corresponding same function in the other of the two monoculars (110) is switched on by means of the analyzer (40) and the regulator (50).

2. The optical assembly (100) as claimed in claim 1, characterized in that the analyzer (40) rates signals received by the two monoculars (110) with respect to at least one of the following parameters:
battery status of the two monoculars;
operational situation of the two monoculars;
ambient parameters of the optical operational situation; and
low light-level intensity.

3. The optical assembly (100) as claimed in claim 1, characterized in that the connecting bridge (10) comprises at least one coupling (20) for each monocular (110) to couple the particular monocular (110) to the connecting bridge (10), said coupling (20) comprising both mechanical coupling elements (22) and electronic coupling elements (24) which are configured in a way that the electronic coupling elements (24) set up electronic contact between the connecting bridge (10) and the particular monocular (110) when, by means of the mechanical coupling elements (22), mechanical contact between the particular monocular (110) and the connecting bridge (10) has been set up, a connector (30) extending at least segment wise between the couplings (20) and linking them mechanically, and in that the analyzer (40), which is electronically connected to the electronic coupling elements (24), is able to exchange electronic signals with said elements (24) and/or is able to set up an electric connection between the electronic coupling elements (24) of the couplings (20).

4. The optical assembly (100) as claimed in claim 1, characterized in that at least one of the monoculars is fitted with an image intensifier tube.

5. The optical assembly (100) as claimed in claim 1, characterized in that at least one of the monoculars is fitted with at least one switchable light source (130).

6. The optical assembly (100) as claimed in claim 1, characterized in that each monocular is fitted with an ocular and an objective lens designed in a manner they subtend a field of view larger than 40° in the plane of observation.

* * * * *